United States Patent
Chen et al.

(10) Patent No.: US 9,695,993 B2
(45) Date of Patent: Jul. 4, 2017

(54) LONG DISTANCE HIGH INTENSITY LED LIGHT WITH ADJUSTABLE FOCUS

(71) Applicant: MAIN HARBOUR INTERNATIONAL LIMITED, Hong Kong (CN)

(72) Inventors: Kaizhi Chen, Guangzhou (CN); Glenn Mankit Tse, Humble, TX (US)

(73) Assignee: MAIN HARBOUR INTERNATIONAL LIMITED, Hong Kong (CN)

( * ) Notice: Subject to any disclaimer, the term of this patent is extended or adjusted under 35 U.S.C. 154(b) by 35 days.

(21) Appl. No.: 14/261,575

(22) Filed: Apr. 25, 2014

(65) Prior Publication Data

US 2014/0321135 A1    Oct. 30, 2014

Related U.S. Application Data (60) Provisional application No. 61/816,350, filed on Apr. 26, 2013.

(51) Int. Cl.
*B60Q 1/26*     (2006.01)
*F21K 99/00*    (2016.01)
(Continued)

(52) U.S. Cl.
CPC .............. *F21K 9/58* (2013.01); *B60Q 1/0483* (2013.01); *B60Q 1/085* (2013.01); *B60Q 1/12* (2013.01);
(Continued)

(58) Field of Classification Search
CPC ..... F21K 9/58; F21S 48/1721; F21S 48/1154; F21S 48/1258; F21S 48/215;
(Continued)

(56) References Cited

U.S. PATENT DOCUMENTS 4,145,113 A * 3/1979 Ranninger ............. G02B 5/285
359/588
6,357,893 B1 * 3/2002 Belliveau ................ F21L 4/027
257/E25.028
(Continued)

FOREIGN PATENT DOCUMENTS

CN            2445185      8/2001
CN       202065898 U      7/2011
(Continued)

OTHER PUBLICATIONS

International Search Report, Jan. 14, 2015, for International Application No. PCT/IB2014/061011.
(Continued)

*Primary Examiner* — Ali Alavi
(74) *Attorney, Agent, or Firm* — Law Offices of Albert Wai-Kit Chan, PLLC (57) ABSTRACT

The present invention provides a lighting device including (i) one or more LED chips positioned on one or more LED chip bases; (ii) one or more lens bases each of which includes one or more lenses, said lens comprises coatings for changing color temperature of the light produced by said LED chips and transmitted through said lens; and (iii) a motion transmission system to change the position of said lens bases relative to said LED chip bases, wherein each of said lenses is placed along the light path of one or more LED chips, and said lens changes the light beam cone angle of light emitted from said LED chips to produce long distance high intensity illumination. In one embodiment, the lens bases can be moved in a direction parallel to the optical axes of said lens, or moved on a plane that is parallel to said LED chip bases.

7 Claims, 6 Drawing Sheets

(51) Int. Cl.

| | |
|---|---|
| *F21S 8/10* | (2006.01) |
| *F21V 14/06* | (2006.01) |
| *B60Q 1/04* | (2006.01) |
| *B60Q 1/08* | (2006.01) |
| *B60Q 1/12* | (2006.01) |
| *B60Q 1/20* | (2006.01) |
| *B60Q 1/24* | (2006.01) |
| *F21S 8/00* | (2006.01) |
| *F21V 9/16* | (2006.01) |
| *F21V 21/30* | (2006.01) |
| *F21W 131/107* | (2006.01) |
| *F21V 23/04* | (2006.01) |
| *F21W 101/04* | (2006.01) |
| *F21Y 105/10* | (2016.01) |
| *F21Y 115/10* | (2016.01) |

(52) U.S. Cl.
CPC ............... *B60Q 1/20* (2013.01); *B60Q 1/245* (2013.01); *B60Q 1/2611* (2013.01); *F21S 8/003* (2013.01); *F21S 48/1154* (2013.01); *F21S 48/1258* (2013.01); *F21S 48/1721* (2013.01); *F21S 48/215* (2013.01); *F21S 48/2206* (2013.01); *F21S 48/33* (2013.01); *F21V 14/06* (2013.01); *B60Q 2300/122* (2013.01); *B60Q 2300/41* (2013.01); *B60Q 2300/42* (2013.01); *F21V 9/16* (2013.01); *F21V 21/30* (2013.01); *F21V 23/045* (2013.01); *F21W 2101/04* (2013.01); *F21W 2131/107* (2013.01); *F21Y 2105/10* (2016.08); *F21Y 2115/10* (2016.08)

(58) Field of Classification Search
CPC ....... F21S 48/2206; F21S 48/33; F21V 14/06; F21V 9/16; F21V 17/02; F21Y 2101/02; F21Y 2105/001; B60Q 1/0483; B60Q 1/085; B60Q 1/12; B60Q 1/20; B60Q 1/2611; B60Q 1/245; B60Q 2300/41; B60Q 2300/42; B60Q 2300/122
USPC ....... 362/487, 231, 235–239, 284, 324, 272, 362/273, 286, 289
See application file for complete search history.

(56) References Cited

U.S. PATENT DOCUMENTS

| | | | | |
|---|---|---|---|---|
| 6,547,414 B2* | 4/2003 | Steger | .................. | F21L 4/00 362/158 |
| 7,445,365 B1* | 11/2008 | Hsu | .................. | B60Q 1/076 362/286 |
| 8,752,977 B2* | 6/2014 | Popper | .................. | F21L 4/04 362/187 |
| 2002/0018348 A1* | 2/2002 | Miki | .................. | B60Q 1/076 362/514 |
| 2009/0296390 A1* | 12/2009 | Dubord | .................. | B60Q 1/24 362/240 |
| 2010/0208371 A1* | 8/2010 | Chao | .................. | F21V 14/02 359/824 |
| 2012/0121244 A1* | 5/2012 | Stavely | .................. | F21V 5/007 396/175 |
| 2012/0300442 A1 | 11/2012 | Popper et al. | | |
| 2014/0301071 A1* | 10/2014 | Jorgensen | .................. | F21V 14/06 362/231 |

FOREIGN PATENT DOCUMENTS

| | | |
|---|---|---|
| CN | 201934999 | 8/2011 |
| CN | 201937927 | 8/2011 |
| CN | 202012805 | 10/2011 |
| CN | 202056619 | 11/2011 |
| CN | 202065898 | 12/2011 |
| CN | 202109328 | 1/2012 |
| CN | 202327911 | 7/2012 |
| CN | 202419376 | 9/2012 |
| CN | 102767781 | 11/2012 |
| CN | 102820414 | 12/2012 |
| CN | 102820414 A | 12/2012 |
| CN | 202613301 | 12/2012 |
| CN | 102997117 | 3/2013 |
| CN | 203176758 | 9/2013 |

OTHER PUBLICATIONS

Written Opinion, Jan. 14, 2015, for International Application No. PCT/IB2014/061011.
Chinese Office Action, Sep. 27, 2016, for Main Harbour International Ltd., Chinese Application No. 201480023937.9, National Stage of PCT/IB2014/061011, Filed Apr. 26, 2013.

\* cited by examiner

LONG DISTANCE HIGH INTENSITY LED LIGHT WITH ADJUSTABLE FOCUS

This application claims benefit of U.S. Ser. No. 61/816,350, filed Apr. 26, 2013. The content of the preceding application is hereby incorporated in their entireties by reference into this application. Throughout this application, various publications are referenced. Disclosures of these publications in their entireties are hereby incorporated by reference into this application in order to more fully describe the state of the art to which this invention pertains.

FIELD OF THE INVENTION

This invention relates to lighting devices and relates particularly to long distance high intensity LED lighting devices with adjustable focus.

BACKGROUND OF THE INVENTION

Figure 1:
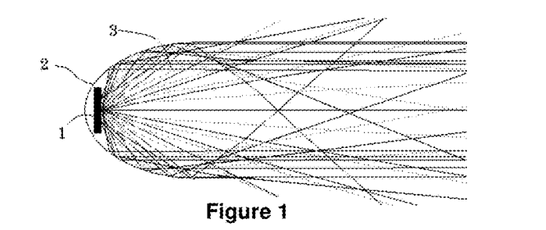
FIG. 1 shows a schematic cross-sectional view of how a LED light using LED chips array 1 with parabolic reflective mirror 2 will produce uncontrollable light beams 3.
Figure 2:
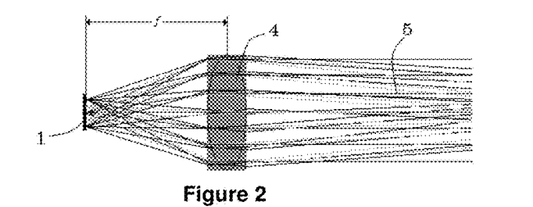
FIG. 2 shows a schematic cross-sectional view of how a LED light using LED chips array 1 with lens 4 will produce uncontrollable light beams 5.
Figure 3:
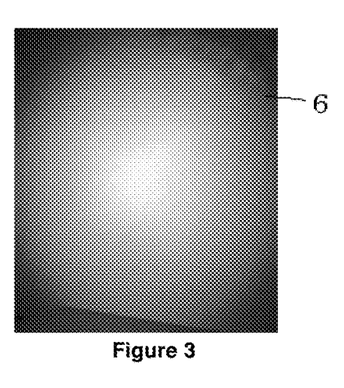
FIG. 3 shows how the LED light described in FIG. 1 and FIG. 2 will produce a light pattern 6 with uneven intensity at a close distance.

A spot light is designed to direct a concentrated beam of light over a designated area at a distance. At present, there is no LED light which can be used to illuminate intensively and effectively for both far and near distance with the same apparatus and consume low power. If a LED light needs to provide a high intensity beam over a long distance, it commonly combines an array of high power LED chips on a planer circuit board and a parabolic concave reflective mirror or a large lens as illustrated schematically in FIGS. 1 and 2. These current approaches have drawbacks such as: (1) Optical principle for diverging or converging light beams only applies to a single point light source. The size of the LED chip array mandates that the light source cannot be a single point. Light beam divergence or convergence cannot be controlled (see FIGS. 1 and 2). This characteristic limits the effective illumination at a distance. Multiple rings of uneven brightness will be observed at a distance. (FIG. 3); (2) Aberration and distortion are significant. It is very difficult to evenly illuminate an area far away; (3) Illuminating power is fairly weak over a distance because most of the light beams are diverged away from the intended target spot. In order to get greater illumination, the LED chips are fed with higher power. Consequently, the light will waste much power, generate a lot of heat and shorten the life of the LED chips; (4) Lenses are usually not designed specifically to suit the optical characteristic of LED chips; (5) Focus adjustable light usually has a mechanism to adjust the position of light source relatively to the lenses or the reflective mirror. Common focus adjustment mechanism is vulnerable to recoil, shock, vibration, lateral force impact and potential water or air leakage.

Hence there is a need for versatile LED lights with low power consumption that can deliver high intensity light beams over a long distance with adjustable focus and direction. In some situations, it would be best that these lights are waterproof and shock proof as well.

SUMMARY OF THE INVENTION

The following presents a simplified summary of some embodiments of this invention in order to provide a basic understanding of the present inventions.

In one embodiment, a light comprising multiple single point LED chips of the same color temperature is provided. Each single point LED chip has its owned specially designed lens according to the specific application of the light. As used herein, the term "focusing lens" or lens used in conjunction with the LED chip of the present invention is not necessary a single lens and can refer to one or many lens used together as a lens group.

In one embodiment, to produce high intensity light beams, the lens is coated with special coatings and shaped according to the optical and electrical properties of the LED chips.

In one embodiment, one or more single point LED chips are mounted on one or more LED chip bases while the corresponding lenses are mounted on one or more parallel lens bases. The two bases are relatively movable. In one embodiment, the distance between the two bases is controlled by specially designed electronic control. The distance between the two bases determines whether the light beams will collimate, diverge or converge. When a LED chip is at one focal length from a lens, light beams from the LED chip after transmitting through the lens will become collimated light beams parallel to the axis of the lens. When a LED chip is within one focal length from the lens, light beams from the LED chip after transmitting through the lens will become divergent from the lens axis. When a LED chip is between one and two focal lengths from the lens, light beams from the LED chip after transmitting through the lens will become convergent at a distance on the lens axis.

In one embodiment, the LED chips are mounted in a special pattern on a planar circuit board. Because the light beams from the LED chips can be controlled to become collimated without much divergence or convergence, an evenly lighted area can be observed at a distance up to several hundred meters away.

In one embodiment, the focus adjustment mechanism is controlled manually. The inner housing for the LED chips and the lenses are completely isolated from the outer focus adjustment mechanism that utilizes magnets of opposite polarization. The lighting device can be water-proof and/or explosive-proof.

In one embodiment, the lights can be used indoor or outdoor on building structures for beautification and illumination purposes.

In one embodiment, the lights can be mounted on automobiles, all terrain vehicles, snowmobiles, fire trucks, boats, ships and helicopters for searching purpose.

In one embodiment, several LED lights of different color temperatures are mounted side by side on a horizontal bar. The lights are powered on in cycle to emulate the effect of a siren. Each LED light can be used individually for illumination purpose too.

In one embodiment, single point LED chips of same color are mounted linearly on a planar circuit board while the corresponding lenses are mounted on another parallel lens base. The lens base can be moved side way by electronically controlled motorized driving gears. In one embodiment, the LED chips are kept on a LED chip base which is at 1.15 focal lengths from the lens base and is perpendicular to the lens axis. The directions of the light beams can be controlled and adjusted while the lens base is moved. This embodiment is particularly useful as automobile headlights which can be controlled to follow the direction of the steering. Thus, a driver can always have the headlights shining at the direction where the automobile is going.

BRIEF DESCRIPTION OF DRAWINGS

FIG. 9A schematically shows two states of the light focus setting. The left lower half of FIG. 9A shows that the distance L1 between lens 8 and LED chip 10 is shorter. The left upper half of FIG. 9A shows the distance L2 between lens 8 and LED chip 10 is longer.

FIG. 10 shows a front perspective view of an embodiment of a 14-LED light. Lens 8 and lens base 9 are shown.

FIG. 11 shows a schematic front layout view and cross-sectional view of a plurality of single point LED chip 10 mounted on a LED chip base 11 to be used with a plurality of specially designed and relatively movable lenses 8 mounted on a parallel lens base 9 as in one embodiment of LED lights. The number of pairs of LED chips 10 and lens 8 shown in these figures are arbitrary and only for illustration purpose.

FIG. 12 shows two cross-sectional views of one embodiment of a LED light. These cross-sectional views show only four out of a plurality of single point LED chips 10, a section of LED chip base 11, corresponding lens 8, a section of lens base 9, driving motor 12, driving bolt 43 and carrier nut 46. The cross-sectional view on the left side of FIG. 12 shows LED chip base 11 and lens base 9 are driven together to a close distance (DOWN). The cross-sectional view on the right side of FIG. 12 shows LED chip base 11 and lens base 9 are driven apart (UP).

FIG. 13 shows one embodiment of a wired hand-held electronic remote control for controlling the driving mechanism of a light. The following buttons are available on this remote control to: A-select, B-brighten, C-diverge, D-dim, and E-converge output light beam.

FIG. 14 shows a schematic cross-sectional view of how LED chips 10 will produce collimated light beams 15 when LED chip base 11 is at one focal length from lens 8 on lens base 9.

FIG. 15 shows a schematic cross-sectional view of how a single point LED chip 10 located at one focal length of lens 8 (focal point 16) on the lens axis 17 will produce evenly illuminated and collimated light beams 15.

FIG. 16 shows a schematic cross-sectional view of how LED chips 10 will produce evenly illuminated, controlled and diverged light beams 18 when LED chip base 11 is within one focal length from lens 8 on lens base 9.

FIG. 17 shows a schematic cross-sectional view of how a single point LED chip 10 located within one focal length of the lens 8 on the lens axis 17 will produce controlled and diverged light beams 18.

FIG. 22 shows one embodiment of a wireless remote control for the embodiments in FIG. 20 and FIG. 23. The following buttons are available: A-Select light group 1; B-Select light group 2; C-Narrow beam angle for far focus; D-Widen beam angle for near focus; E-Rotate lights counter clockwise; F-Tilt lights downward; G-Power on/off remote control; H-Brighten lights; I-Continuously on or strobe; J-Dim lights; K-Tilt lights upward; L-Rotate lights clockwise.

DETAILED DESCRIPTION OF THE INVENTION

In the following description, several embodiments of the invention are described. For purposes of explanation, specific configurations and details are set forth in order to provide a thorough understanding of the embodiments. In addition, to the extent that orientations of the embodiments are described as, "top", "bottom", "front", "back", "left", "right" and the like, these wordings are to aid the reader in understanding the embodiments and are not meant to be limiting physically. It is apparent to a person skilled in the art that the present invention may be practiced without specific details. The invention will be better understood by reference to the examples which follow, but those skilled in the art will readily appreciate that the specific examples are for illustrative purposes only and should not limit the scope of the invention which is defined by the claims which follow thereafter. It is to be noted that the transitional term "comprising" or "including", which is synonymous with "containing" or "characterized by", is inclusive or open-ended and does not exclude additional, unrecited elements or method steps. As used herein, the term "focusing lens" or lens used in conjunction with the LED chip of the present invention is not necessary a single lens and can refer to one or many lens used together as a lens group.

In one embodiment, there is provided a lighting device comprising: (i) one or more LED chip bases each of which comprises one or more single point LED chips; (ii) one or more lens bases each of which comprises one or more lenses, said lens comprises coatings for changing the color temperature of light produced by LED chips and transmitted through said lens; and (iii) a motion transmission system to change the position of said lens bases relative to said LED chip bases, wherein each of said lenses is placed along the light path of one or more LED chips, and said lenses change the light beam cone angle of light emitted from said LED chips to produce high intensity illumination. In one embodiment, the light beam cone angle is from about 1° to about 80°. In one embodiment, the lighting device comprises 1, 3, 6, 7, 9, 14, 18 or 36 single point LED chips.

In one embodiment, the motion transmission system is driven manually or by a motorized mechanism. In one embodiment, the motion transmission system is controlled by a wired or wireless remote control device.

In one embodiment, said motion transmission system moves said lens bases along a path that is parallel to the optical axes of said lenses.

In one embodiment, said motion transmission system includes a shock-resistant configuration comprising (i) a motor comprising a cover and a shaft, said shaft comprises a flat surface on one side, and (ii) a driving bolt with an inner hole, the shape of said inner hole matches the cross-sectional shape of said shaft, wherein said shaft is coupled to said bolt through said inner hole, wherein rotational force is directly transmitted from the shaft to the driving bolt while lateral force in the direction of the shaft is transmitted onto the cover of the motor.

In one embodiment, said motion transmission system comprises (i) a driving bolt which is coupled to a lens base at one end and connected to a plurality of first magnets at the other end, and (ii) a hand wheel comprising a plurality of second magnets, said second magnets are of opposite polarity to said first magnets and are positioned opposite to said first magnets, wherein rotating said hand wheel would rotate said driving bolt through magnetic attraction between said first and second magnets, thereby moving the lens base along a path that is parallel to the optical axis of said lens.

In one embodiment, said motion transmission system comprises a hand wheel enveloping a housing that comprises a lens base, said hand wheel comprises a first magnet affixed to the inner wall of said hand wheel, said first magnet is of opposite polarity to a second magnet and is positioned opposite to said second magnet which is affixed on said housing, wherein rotating said hand wheel and through magnetic interaction between said first and second magnets, a cam groove will rotate synchronously and move a direction driving pin along a position guiding groove, thereby moving the lens base along the optical axis of said lens.

In one embodiment, said cam groove is craved at 30° to 60° relative to the optical axis of said lenses, thereby transmitting a major portion of said magnetic interaction to said direction driving pin in the direction of the optical axis of said lenses.

In another embodiment, said motion transmission system moves said lens bases on a plane that is parallel to said LED chip bases. In one embodiment, said motion transmission system rotates a lens base relative to a LED chip base, thereby placing each of said lenses along the light path of two or more LED chips. In one embodiment, said lighting device emits light beams in a plurality of colors. In another embodiment, said lighting device emits light beams in a plurality of directions.

In one embodiment, said motion transmission system comprises a driving gear on a shaft of a motor, said driving gear is coupled to a transmission shaft that is engaged to two or more lens bases, wherein rotation of said driving gear will cause rotation of said transmission shaft, thereby resulting in moving two or more lens bases on a plane that is parallel to said LED chip bases. In one embodiment, moving said lens bases on a plane that is parallel to said LED chip bases will cause light transmitted through lens on different lens bases to converge into a single spot or separate into a plurality of spots. In one embodiment, said lighting device comprises two or more LED chips on a plurality of LED chip bases. In another embodiment, said lighting device comprises nine single point LED chips on a plurality of LED chip bases. In one embodiment, said lighting device is used as headlight for an automobile. In one embodiment, the direction of light beam emitted can be changed according to the steering direction of the automobile.

EXAMPLE 1

Choice of LED, Designing Lens and Coatings

Figure 4:
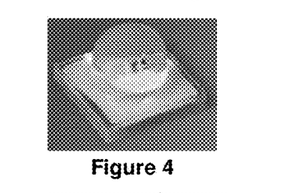
FIG. 4 shows an enlargement view of a LED chip which is a surface mount device (SMD) ceramic package with silicon base resin dome cover. Chip size is 1 mm×1 mm. Light beam cone angle is 80°. Color temperature is 6500K. Manufacturer recommended power requirement is 700 mA at 3.2V for optimal lumens.
Figure 5:
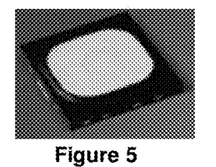
FIG. 5 shows an enlargement view of a LED chip which is a SMD ceramic package with a silicon base resin flat cover. Chip size is 1 mm×1 mm. Light beam cone angle is 120°. Color temperature is 6500K. Manufacturer recommended power requirement is 700 mA at 3.1V for optimal lumens.
Figure 6:
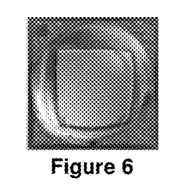
FIG. 6 shows an enlargement view of a LED chip which is a SMD ceramic package with a silicon base resin flat dome cover. Chip size is 1.5 mm×1.5 mm. Light beam cone angle is 115°. Color temperature is 3000K. Manufacturer recommended power requirement is 700 mA at 2.9V for optimal lumens.

The first step in designing a LED light with low power consumption and high intensity light beam is to select LED chips which are suitable for the underlying applications. Based on experiments with many LED chips available on the market, it is concluded that the size of emitting area, light beam cone angle and color temperature of light are three of the most important properties. Some LED chips on the market are transparently sealed with dome covers or flat covers. Either way, all LED chips are radiating light spherically. The radius and curvature of the covers define the light beam cone angle. For example, a LED chip from one manufacturer produces light beam cone with 80° angle. A LED chip from another manufacturer produces light beam cone with 120° angle. Table 1 shows some testing results. The testing power for each LED chip is slightly different but the power is close enough. It is because each chip has its own power requirements suggested by its manufacturers.

TABLE 1

Testing Results of LED Chips Raw Illuminating Intensity

| Properties | Light Intensity |
|---|---|
| LED Chip #1 (FIG. 4): | 104 LUX @ 1M |
| Surface Mount Device (SMD) | Test power: 700 mA, |
| ceramic package with dome cover. | 3.2 V. |
| Light beam cone angle: 80°. | |
| Chip size: 1 mm × 1 mm. | |
| Color temperature: 6500 K. | |
| LED Chip #2 (FIG. 5): | 73 LUX @ 1M |
| SMD ceramic package with flat cover. | Test power: 700 mA, |
| Light beam cone angle: 120°. | 3.1 V. |
| Chip size 1 mm × 1 mm. | |

TABLE 1-continued

Testing Results of LED Chips Raw Illuminating Intensity

| Properties | Light Intensity |
|---|---|
| Color temperature: 6500 K. | |
| LED Chip #3 (FIG. 6): | 96 LUX @ 1M |
| SMD ceramic package with dome cover. | Test power: 700 mA, |
| Light beam cone angle: 115°. | 2.9 V. |
| Chip size: 1.5 mm × 1.5 mm. | |
| Color temperature: 3000 K. | |

Figure 7:
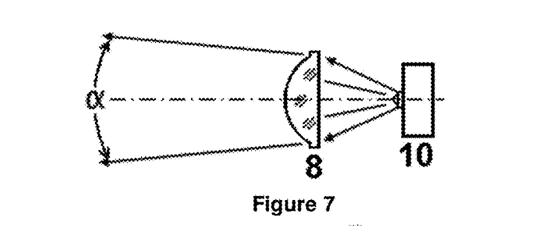
FIG. 7 shows a schematic view that a lens 8 is placed in front of a LED chip 10 to alter the properties of the output light beam.

In order to project intensive light beams farther, a lens 8 is placed in front of the LED chip 10 to reduce the light beam cone angle α as in FIG. 7. In one embodiment, aspheric lens is chosen to project the LED light beam. While operating the same LED chip 10 with same corresponding power supply as in Table 1, lens with various diameters and focal lengths make a big difference in the output beam cone angles and light intensity. A lens with larger focal length will produce a smaller light beam cone angle α and higher LUX value at the same distance. Table 2 shows some testing results.

TABLE 2

Testing Results of LED Chips in Table 1 With Projection Lens

| LED Chip Properties and Power Supply (same as Table 1) | LUX @ 7M (Lens Aperture Φ20 mm f20.7 mm) | LUX @ 7M (Lens Aperture Φ28 mm f33 mm) | LUX @ 7M (Lens Aperture Φ48 mm f47 mm) |
|---|---|---|---|
| LED Chip #1 (FIG. 4) | 231 LUX α min 5° | 423 LUX α min 3.2° | 1000 LUX α min 2.2° |
| LED Chip #2 (FIG. 5) | 370 LUX α min 2.8° | 676 LUX α min 1.7° | 1600 LUX α min 1.2° |
| LED Chip #3 (FIG. 6) | 100 LUX α min 8.3° | 185 LUX α min 5.2° | 300 LUX α min 3.6° |

According to Table 2, light beam focused through aspheric lens has much stronger intensity than what raw LED chips can produce. For example, light intensity of raw LED Chip #2 is only 73 LUX at 1 meter according to Table 1. Extra tests were performed on LED Chip #2. Light intensity from a raw LED Chip #2 at 7 meters was found to be 1.6 LUX. By transmitting through an aspheric lens of 48 mm aperture and 47 mm focal length, the light intensity becomes 1600 LUX at 7 meters, which is a thousand times stronger. It is unnecessary that the lens must be aspheric. After experiments with different types of lens and the chosen LED chip in our embodiments, aspheric lens produces the best results with our chosen LED chip. However, the present invention is not limited to the use of aspheric lens. The properties of LED chip are the most important factors when designing for a focusing lens. Specific examples herein are for illustrative purposes only and should not limit the scope of the invention which is defined by the claims which follow thereafter.

To further raise light intensity, it is necessary to raise the transmission rate of the focusing lens and protective lens as well as the reflectivity of the inner wall of lens housing and light shield. LED chip emits light of a rather narrow spectrum. Special anti-reflection coating to suit each color temperature is applied. The coating raises light intensity by more than 5% to 8%. In addition, coating inner wall of the lens housing and light shield with aluminum film can raise the reflectivity.

While using similar power supply, LED chip emitting cold white light of high color temperature (such as 6000K or higher) provides 35% to 55% more lumens than a LED chip emitting warm white light of low color temperature (such as 3000K or less). For example, if a 2800K LED chip is used in automobile application, the power needs to be raised to produce higher lumens. Unnecessary energy is wasted. If high color temperature LED is used, cold white light can irritate and damage human eyes. Bright cold white light can even cause short term blindness if stared at. Using cold white light in driving is dangerous to both approaching drivers and pedestrians. Almost all countries now ban the use of high color temperature light such as HID lights on automobiles. Many automobile lighting applications will use tinted glass or tinted polycarbonate (PC) to change light color temperature. Whether it is tinted glass or tinted PC, the tinting is achieved by adding various colorants. Not only the colorant will absorb light, but it will also block heat transfusion. LED not dissipating heat properly during operation will be damaged. The life of the LED is shortened.

In order to use high lumen LED chip emitting cold white light, coating is applied on lens to lower color temperature and to transfuse radiating infrared heat. There are several advantages to apply coating to lens: (1) Light transmission ratio can be raised by 5% to 8%; (2) Lens coating can change light color temperature as well as transmitting radiating infrared heat. Reducing the risk of overheating can prolong the useful life of LED chip; (3) Customized coating for different applications is much easier and quicker than producing differently tinted PC or glass filters; and (4) Power consumption is lower. By using lens with special coating, LUX from high color temperature LED is much higher than low color temperature LED using same power.

Use of coatings to change color temperature has been commonly known and used in the field of non-LED lighting and other optical equipment design. The technique for designing and applying coatings has been disclosed, for example, in U.S. Pat. No. 4,145,113. Further development of coatings applicable to LED light spectrum has been disclosed in, for example, Chinese patent CN1034878363A. Based on the technique and methods known in the arts, one of ordinary skill in the art would readily apply coatings to the lenses used in the present invention based on chosen LED chip characteristics. The coatings change color temperature of the LED light spectrum. One of ordinary skill in the art would readily determine the exact thickness of each coating layer or number of coating layers needed for each LED chip used.

After transformation through lens with coatings, transformed warm white light of 3000K only loses 4% of the lumens from original cold white light of 6500K. A 6500K cold white light LED chip with special coating can emit 48% more LUX than what a 3000K warm white light LED chip can emit. Table 3 shows some testing results of one embodiment.

TABLE 3

Test Results of a 14 LED Light @ 5.7M With α Min 6°

| Color Temperature of Light Output at 12 V, 400 mA | Uncoated Lens | Lens Coated for Better Transmission Only | Lens Coated for Better Transmission and Color Temperature Transformation from 6500 K to 3000 K |
|---|---|---|---|
| 6500 K | 2245 LUX | 2440 LUX | 2350 LUX |
| 3000 K | 1580 LUX | 1706 LUX | Not Applicable |

In conclusion, using specially coated lens to reduce the light beam cone angle, to change the color temperature and to increase transmission rate of the light produced by LED chip are three important design principles for creating long distance high intensity LED lights. We cannot document every possible combination and relation of coatings and lens shape for each kind of LED chip. Those skilled in the art will readily appreciate that the above examples are for illustrative purposes only and should not limit the scope of the invention defined by the claims which follow thereafter.

EXAMPLE 2

Shock Proof Mechanisms

Figure 8:
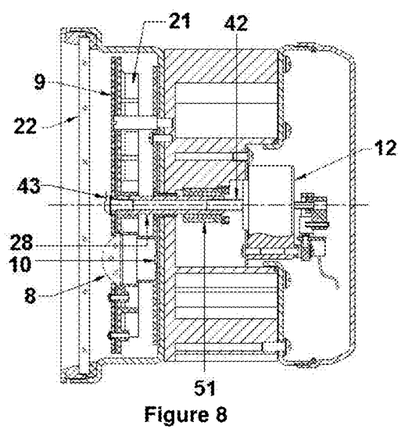
FIG. 8 shows a perspective view of an embodiment wherein the lens base 9 is directly driven by the shaft 42 of the focus adjustment mechanism.

A vulnerable part of a focus adjustable light is the mechanism to adjust the focus of the light beam. The most common method is to move the lens mounted on a planar base back and forth from the light source by using gears and shafts. FIG. 8 shows an example of a light that uses motorized shaft and gear method for focus adjustment. A protective lens 22 is installed to protect the lens housing 21. Focusing lens 8 is mounted on a planar lens base 9. Shaft 42 of motor 12 has a bolt 43 which is directly coupled to threaded tube 28 of lens housing 21. When motor 12 turns clockwise or counter clockwise, shaft 42 will turn bolt 43 which will move threaded tube 28 forward or backward, respectively. Lens 8 of lens housing 21 is moved forward or backward relatively from LED chips 10. The light beam focus is changed. Lens housing 21 is quite heavy with delicate lens 8 such as those used on vehicles and ships. The operating environment is full of vibrations and shocks, impact force created by the weight of lens housing 21 will directly transmit to shaft 42. Shaft 42 is supported by only two tiny bearings 51 to allow in-place rotation. Bearings 51 cannot withstand impact forces long term. Shaft 42 will be knocked out of alignment, affecting the focus adjustment mechanism. Lights using this kind of structural design cannot be shock proof.

Figure 9A:
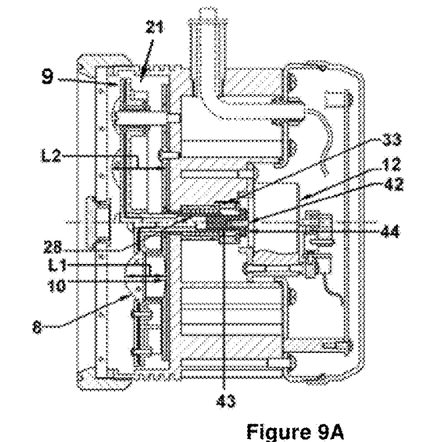
FIG. 9A shows a perspective view of an embodiment wherein the lens housing 21 is indirectly driven by the shaft 42 of the focus adjustment mechanism.
Figure 9B:
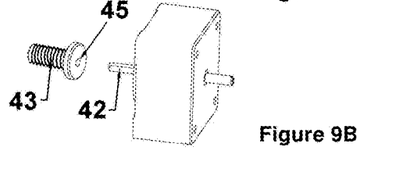
FIG. 9B shows a perspective view of an enlargement of the mating hole 45 on special bolt 43 and the shape of shaft 42 in FIG. 9A.

FIG. 9A shows one embodiment of a specially designed shock proof light. This light is similar to the non-shock proof light in FIG. 8 except how shaft 42 is connected to lens housing 21. Shaft 42 of motor 12 is changed from a cylindrical shape to a rod with flat surface on one side. A special bolt 43 with a hole 45 mating with shaft 42 is used (FIG. 9B). Because shaft 42 and mating hole of bolt 43 are tightly coupled, there exists only a relationship of toggling and rotation. The exterior of bolt 43 and threaded tube 28 are tightly coupled. Bolt 43 is locked in place by locking sleeves 33 which are not pressing onto bearings 51. Lubricating plates 44 are inserted between locking sleeves 33 and the cover of motor 12. Bolt 43 cannot move back and forth, but only to turn threaded tube 28 when shaft 42 rotates and toggle bolt 43 to rotate. As threaded tube 28 rotates, it will move forward and backward and change the relative distance between lens base 9 and LED chips 10. Changing the relative distance will change the light beam focus. FIG. 9A shows two possible states. The left lower half of FIG. 9A shows that the distance L1 between lens 8 and LED chip 10 is shorter. The left upper half of FIG. 9A shows the distance L2 between lens 8 and LED chip 10 is longer. This structural design proves that the impact force created by the weight of the lens housing 21 due to vibrations or shocks will transfer to bolt 43 through threaded tube 28. Subsequently, bolt 43 will transfer the impact force to locking sleeves 33 then going onto lubricating plates 44 which transfer the force directly on to the outside cover of motor 12. Shaft 42 is not impacted by the impact force transmitting in the lens axis direction. It will guarantee motor 12 to rotate precisely.

Lights built with this structural design have been tested in real operating situations to withstand 150G impact force at a frequency of 100 Hz. It is sufficient to be used in most operating situations with a lot of vibrations and impact shocks.

EXAMPLE 3

Light Beam Focus and Direction Control Mechanism

Figures 10, 11, 12, 13, 14, 15, 16, 17:
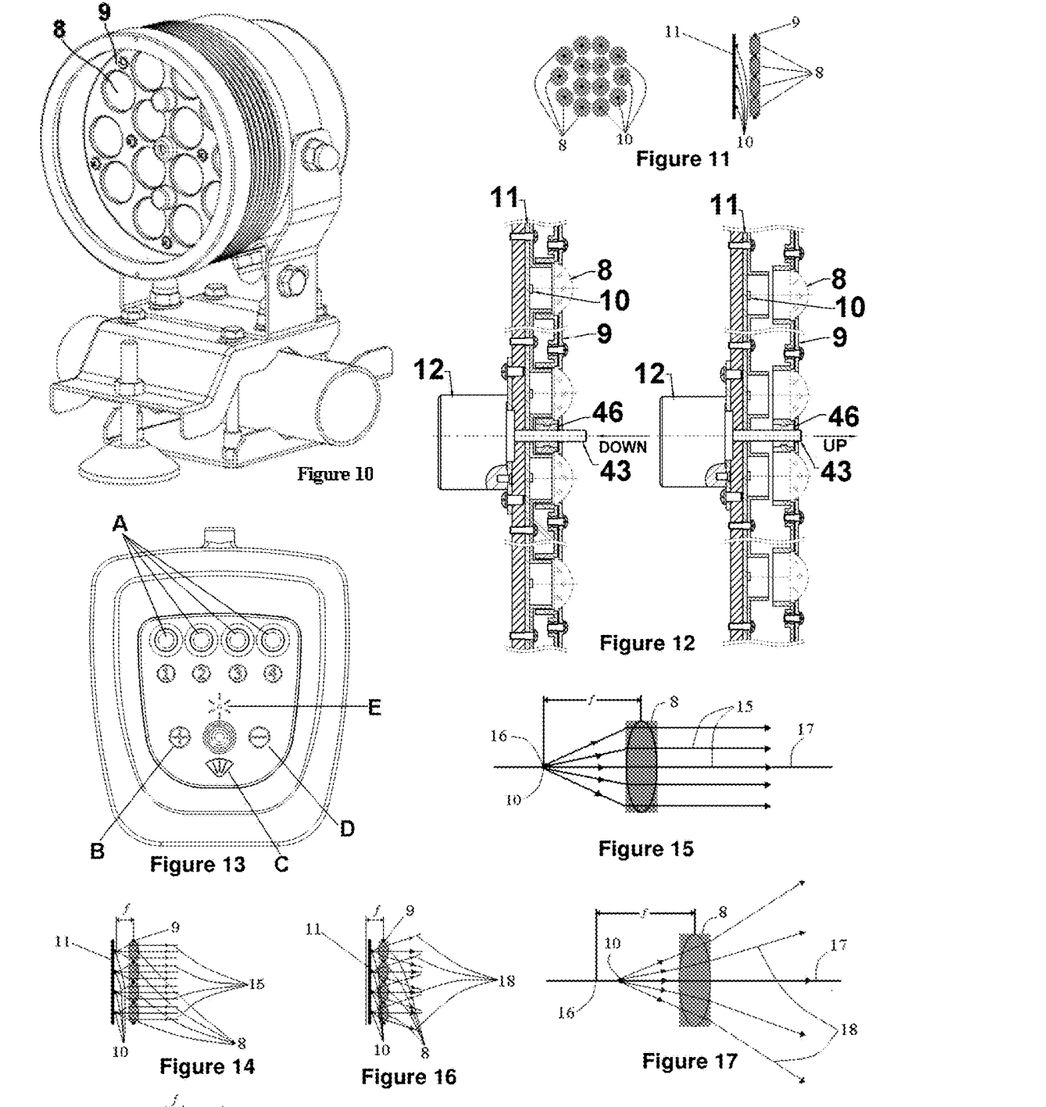

FIG. 10 shows one embodiment of a LED light. In this embodiment, one of the smallest LED chips with the highest illuminating power available in the market is chosen. The LED chip can be considered as closely enough as a single point light source. While technology in LED field is advancing, smaller and more powerful LED chip will be developed. Accordingly, it is expected that LED chips can be replaced in the future with smaller and more powerful chips to achieve stronger illuminating power.

The layout pattern of this embodiment is circular in shape (FIG. 11). However, layout pattern can be in any shape and the number of pairs of single point LED chip 10 and lens 8 can be one to many depending on the underlying application. The shape of the layout and the number of pairs of LED chip 10 and lens 8 are chosen based on a number of factors such as available space and shape and power, heat dissipation condition and required light intensity. In one embodiment, a light is mounted inside the front bumper of a vehicle as a fog light. The precut hole on the bumper is round in shape. The embodiment is round in shape to fit into the bumper. The size of the hole would allow at most 6 pairs of LED chips and lens.

In one embodiment (FIG. 10), LED light implements 14 single point LED chips with 14 specifically designed lens 8. The 14 lens 8 are mounted on a planar lens base 9, while the 14 single point LED chips are mounted on a LED chip base which is parallel and behind lens base 9.

FIG. 11 shows a schematic front layout view and cross-sectional view of the LED light in FIG. 10. LED chip base 11 and lens base 9 are relatively movable. The number of pairs of LED chips 10 and lens 8 shown in these figures is for illustration purpose only.

In one embodiment (FIG. 12), lens base 9 is moved by motor 12 having a driving bolt 43 and nut 46. Motor 12 can be controlled by, for example, a wired remote control as shown in FIG. 13. When LED chip base 11 is at 1 focal length from lens base 9 as shown in FIG. 14 and FIG. 15, light beams 15 from all single LED chips 10 will be collimated travelling perpendicular to lens base 9 or parallel to lens axis 17. Theoretically light beams 15 can travel as far as to infinite distance without divergence in any direction. The illumination of the light of present invention is observed and measured from long distance such as 100 meters away. Light beams are still highly concentrated and vivid. The LUX measured at 100 meters from the light is still as high as 95% of the LUX measured at 5 meters away. No significant dispersion is observed. Because the layout of single LED chips 10 and corresponding lens 8 are circular in shape, multiple lens axes 17 are also circular in shape. Each lens 8—LED chip 10 pair will produce a circular shape of evenly illuminating beams 15 around the axis of the pair. The resultant illuminated area is circular in shape and evenly illuminated.

In another embodiment (FIG. 16 and FIG. 17), when LED chip base 11 is moved within 1 focal length from lens 8, light beams 18 from LED chips 10 will be diverged from multiple lens axes 17 in a controlled way. The divergence of a single point light source through a lens is predictable, and becomes controllable. Light beams 18 from all LED chips 10 and lens 8 pairs are all diverged in the same angle and direction. This allows effective control of the illuminated area.

Figure 18:
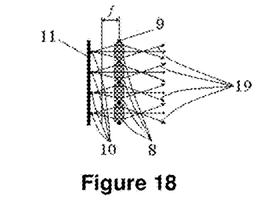
FIG. 18 shows a schematic cross-sectional view of how LED chips 10 will produce evenly illuminated, controlled and converged light beams 19 when LED chip base 11 is between one to two focal lengths from lens 8 on the lens base 9.
Figure 19:
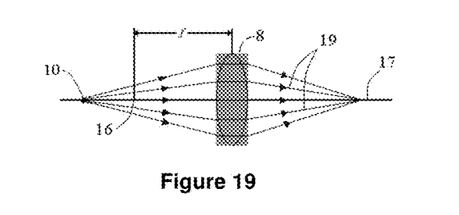
FIG. 19 shows a schematic cross-sectional view of how a single point LED chip 10 located between one to two focal lengths of lens 8 on the lens axis 17 will produce controlled and converged light beams 19.

In another embodiment (FIG. 18 and FIG. 19), when LED chip base 11 is moved to a distance between 1 and 2 focal lengths from lens 8, light beams 19 from LED chips 10 will be converged to lens axes 17. The converging effect of a single point light source through a lens is also predictable, and becomes controllable. Light beams 19 from all LED chips 10 and lens 8 pairs are all converged in the same angle and direction. This allows a very effective illumination at a short distance. The illuminating power of the converging beams will be more than that of the parallel beams at the same distance.

Figure 20:
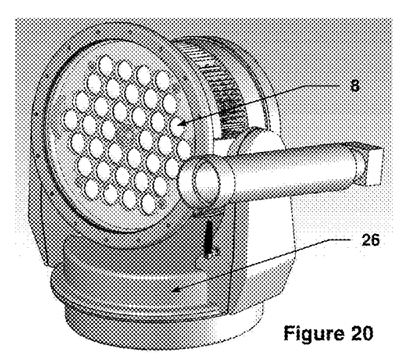
FIG. 20 shows a front perspective view of one embodiment of a 36-LED light. The lenses 8 are shown. The functions of this light can be controlled via a wireless remote control like the one shown in FIG. 22.
Figure 21:
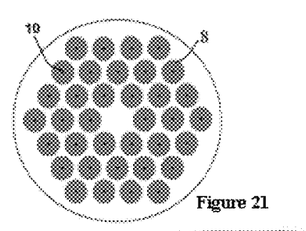
FIG. 21 shows one embodiment of a front layout view of the LED spot light of FIG. 20. The layout of 36 pairs of lens 8 and LED chips 10 is hexagonal in shape. However, the layout can be in any shape depending on requirements of specific application.
Figure 22:
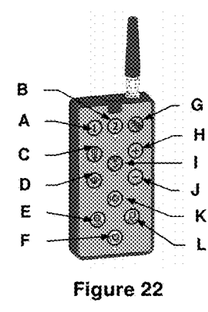

In one embodiment (FIG. 20 and FIG. 21), there is provided a LED light with 36 single point LED chips 10 and 36 specifically designed lens 8. The layout pattern is hexagonal in shape. The light is constructed similarly to the light shown in FIG. 10. The light weighs heavily and is mounted on a specially designed base 26 that can be attached on ground indoor or outdoor, on vehicles, or on vessels. The light and the base 26 can be controlled by a wireless remote control (FIG. 22). Two groups of lights (e.g. 16 lights each) can be controlled by group selection 1, 2 (buttons A and B). The remote control can be toggled on or off (button G). The remote control can also dim (button J) or brighten (button H) groups of lights, toggle lights into continuously on or strobe mode (button I), diverge (button D) or converge (button C) light beams for near or far field illumination, respectively; tilt lights down (button F) or up (button K) vertically up to 210°; and rotate the base clockwise (button L) or counter-clockwise (button E) 360°. Basically, the light can be controlled remotely to light up all surrounding area in three dimensions.

Figure 23:
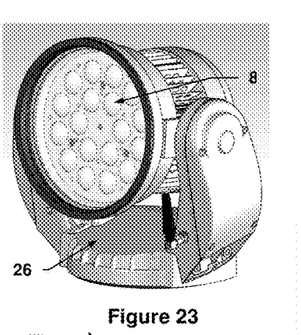
FIG. 23 shows a front perspective view of one embodiment of an 18-LED light. Functions of this light can be controlled by a wireless remote control as shown in FIG. 22.
Figure 24:
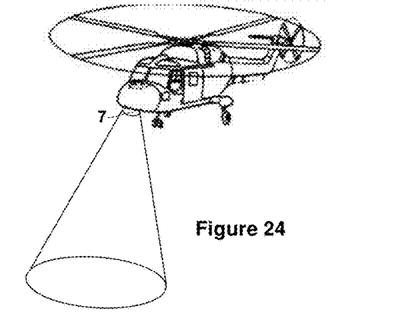
FIG. 24 shows an illustration that LED lights 7 of present invention are mounted on a helicopter for wide area illumination.
Figure 25:
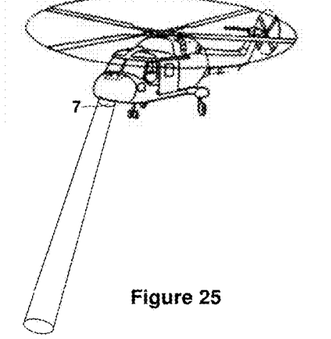
FIG. 25 shows an illustration that LED lights 7 of present invention are mounted on a helicopter for a small area illumination.

In one embodiment, FIG. 23 shows a LED light with 18 single point LED chips and 18 specifically designed lens 8. The layout pattern is circular in shape. The light can be mounted on specially designed base 26 like those for the 36-LED light shown in FIG. 20. The base 26 and the light can be controlled by the same wireless remote control as shown in FIG. 22. The reason that 18 LED chips are chosen is to maximize power usage provided by 12 or 24 volt batteries used in most mobile applications. The 18-LED light can be mounted on the base of a machine gun on board a helicopter (schematically shown in FIG. 24 and FIG. 25). In one testing, 800 rounds of shootings were logged from the machine guns. There was no damage to the light due to impacts from all recoil force, flying and vibration. The size of lights to be used on helicopters is strictly limited by available space on board. While a helicopter is flying high, it can use the diverging mode of the light to illuminate a wider area for searching (FIG. 24). If the helicopter is flying low, it can use the converging or collimated mode of the light to focus on smaller area for searching (FIG. 25).

Figure 26:
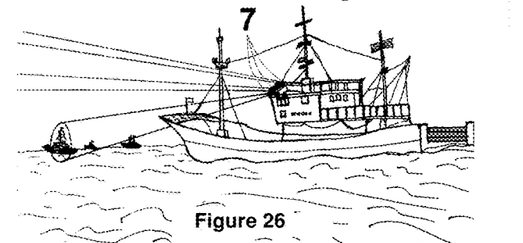
FIG. 26 shows an illustration of using LED lights 7 of present invention on fishing boats.
Figure 27:
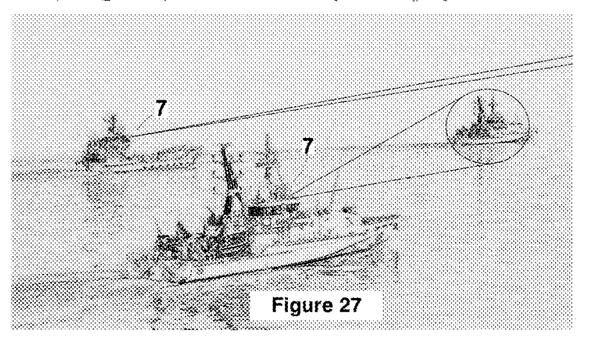
FIG. 27 shows an illustration of using LED lights 7 of present invention on patrol boats.

In another embodiment, a light 7 (e.g. with 36-LED chips) is used as a search light on fishing boats (FIG. 26) or patrol ships (FIG. 27). Ships and boats have more space and more power to accommodate a larger light. The lights of the present invention with their high intensity, long distance, concentrated and focus-adjustable characteristics have demonstrated to be very effective for lighting in foggy, total darkness or low visibility environment.

In another embodiment, the present lights can be used in emergency and rescue missions. Dense smoke and fire associated with most fire scenes or dusts associated with earth quakes and other natural disasters usually prohibit emergency personnel from pinpointing or communicating the locations where help is needed. In accordance with this embodiment (FIG. 28), light mounted on special base can be controlled to directly zoom at the locations of the emergency personnel who are calling for help. Emergency personnel locations can be determined automatically by using data feed from locator device carried by emergency personnel. This type of locator device is usually based on Global Positional System (GPS). GPS locator device and programmable controls can be designed by one of skill in the relevant technology fields.

Figure 28:
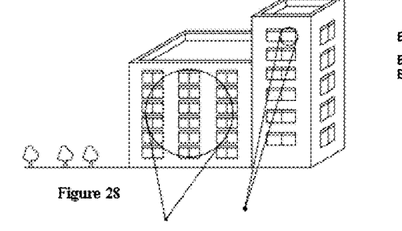
FIG. 28 shows an illustration of using LED lights of present invention in front of buildings for emergency rescue mission (right side) or beautification purposes (left side).

In another embodiment, FIG. 28 shows a LED light can be used for beautification and illumination of a building.

EXAMPLE 4

Long Distance Multiple Beam Spot Light

In one embodiment (FIG. 29), a LED light is constructed with three groups of LED chips 10. Each group has two LED chips 10 with a total of six LED chips 10. The light can be made to emit light with multiple color combinations. For example, the first group of LED chips 10 can be red and blue, the second group can be blue and green, and the third group can be green and red. The light can produce 6 intensive colorful light beams 34, 35 in six different directions at the same time. The light is perfect to be used for light show performance. All six LED chips 10 are mounted on a LED chip base 11 and the groups are separated by 120°. This embodiment assigns one lens 8 for each group of 2 LED chips 10 with a total of three lens 8. Lenses 8 are mounted on a lens base 9 parallel to LED chip base 11. The distance between the two bases 9, 11 is kept at 1 focal length of lens 8. Because the distance between LED chips 10 and lens 8 is 1 focal length, almost collimated light beams 34, 35 of different colors will be produced. Light beams 34, 35 cannot be perfectly collimated because there are two LED chips 10 for each lens 8. The position of LED chips 10 will be slightly off from the light axis of corresponding lens 8. A driving mechanism is designed and installed to rotate lens base 9 back and forth by 15° repeatedly by connecting a driving motor 12 to driving gears 28 to transmission shaft 42 and finally to the center of lens base 9. The light will produce 6 vivid and vibrant light beams 34, 35. In one embodiment, 2 beams are red, 2 beams are green, and 2 beams are blue. 15° is the most optimal angular movement to produces the most vivid, vibrant and highly concentrated light beams 34, 35. Too much rotation will reduce the luminous effect of LED chips 10 because light beams 34, 35 will not be collimated enough to keep the high intensity at long distance. White, red, green and blue LED chips are available on the market. Other color light beam can be produced by combining red, blue and green color lights in various intensities. Theoretically, light beams of infinite number of colors can be produced. There are many other ways to control the movement of the light beams. The above description by no means limits this invention to just this embodiment. The above embodiment describes fixing the positions of LED chip base 11 while moving lens base 9. According to the same optics principles, other embodiments can be designed by fixing the positions of the lens base while moving the LED chip base.

In accordance with one embodiment (FIG. 30), several multiple beam spot lights have been installed on top of a sight-seeing boat which sailed on rivers at tourist spots. When the lights are turned on, the vivid and lively light beams shine far into the sky and attract a lot of attentions. Watching the lively light beams dancing can become a big tourist attraction.

EXAMPLE 5

Head Light for Automobile

Figures 29, 30, 33, 34A, 34B, 34C, 35A, 35B:
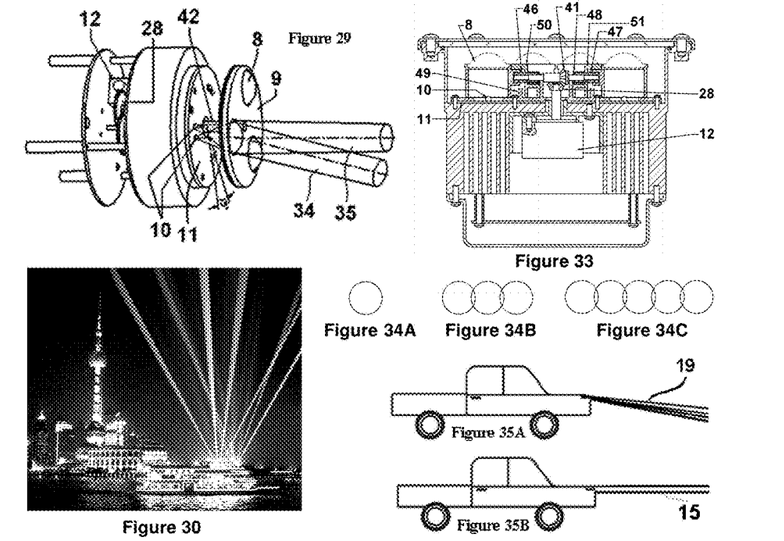
FIG. 29 shows a side perspective view of one embodiment of a 6-LED multiple color light producing multiple light beams 34, 35 of different colors with adjustable direction.
FIG. 30 shows an illustration of using multiple beam LED lights of present invention on sightseeing tourist boats.
FIG. 33 shows a cross sectional view of the embodiment in FIG. 31.
FIG. 34A shows the light beam generated by the LED light of FIG. 31 in neutral position.
FIG. 34B shows the light beam generated by the LED light of FIG. 31 in the first shifted position.
FIG. 34C shows the light beam generated by the LED light of FIG. 31 in the second shifted position.
FIG. 35A shows an illustration of using LED lights of present invention as headlights on automobile, producing light beams 19 for near illumination.
FIG. 35B shows an illustration of using LED lights of present invention as headlights on automobile producing light beams 15 for far illumination.

In one embodiment (FIG. 31, FIG. 32 and FIG. 33), 9 LED chips 10 are placed on the axes of 9 corresponding lens A1-A9. The lenses are mounted on lens bases B1-B5. Lens A1, A2 and A3 are mounted on lens base B1. Lens A4 is mounted on lens base B2. Lens A9 is mounted on lens base B3. Lens A7 and A8 are mounted on lens base B4. Lens A5 and A6 are mounted on lens base B5. Initially, every LED chip 10 is positioned at the focal point of the corresponding lens (A1-A9). FIG. 34A (neutral position) shows a light beam pattern formed at 10 meters away after the light from LED chips 10 is transmitted through the lenses (A1-A9). Lens base B1 is stationary, while the other lens bases (B2-B5) can be moved by a driving mechanism. When motor 12 turns, gear 28 on motor shaft 42 will rotate transmission shaft 41. The two ends of transmission shaft 41 have left-turning screw threads and right-turning screw threads 50 that will push the two nuts 46, 47 on lens bases B4, B5, respectively. The pressure from springs 48 will cause lens base B4 to move to the right along with lens base B3. Lens base B5 will move to the left along with lens base B2. After moving 1.25 mm, lens bases B4, B5 are stopped by positioning plates 49. A light beam pattern of three circles in a row will appear (FIG. 34B). This is the first shifted position. When the transmission shaft 41 continues to turn, it will push lens base B2 to the left through nuts 46 and lens base B3 to the right through nuts 47. Lens bases B2, B3 move another 1.25 mm and stop. A light beam pattern of five circles in a row will appear (FIG. 34C). This is the second shifted position. The light applying this movement principle is very useful in automobile application. The lighting area will be widened. Headlight turns in accordance with steering direction can be easily implemented with similar design.

Figure 31:
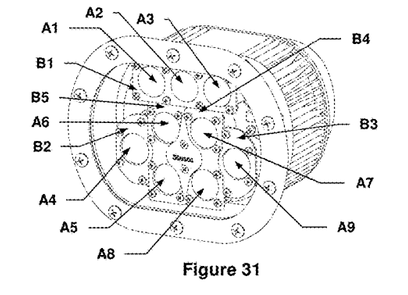
FIG. 31 shows a front perspective view of one embodiment of a 9-LED single-color light producing light beams with adjustable direction.
Figure 32:
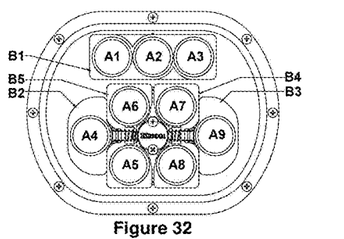
FIG. 32 shows a front view of the embodiment in FIG. 31.

In another embodiment (FIG. 35A and FIG. 35B), a modified version of the LED light as shown in FIG. 31 is used as headlights for automobile. In one embodiment, movement of lens base and LED chip base is automatically controlled by software programs built into on-board computer of a vehicle with data supplied by built-in sensors such as forward sensors of the vehicle. When light from on-coming traffic headlights or light from the tail lights of closely-preceding vehicle is detected by the sensors, on-board computer can automatically adjust LED headlight into converging mode (FIG. 35A), i.e. adjusting the distance between the LED chip base and the lens base to be between 1 and 2 focal lengths. Light beams 19 from the headlight will zoom in at a shorter distance so as not to irritate the driver of on-coming vehicle or the preceding vehicle. While there is no on-coming traffic or closely-preceding vehicle, the headlights can be adjusted to collimated mode (FIG. 35B), i.e. adjusting the distance between the LED chip base and the lens base to be 1 focal length so that light beams 15 from the headlight would zoom afar. The driver of the vehicle will see much better. The sensors and the on-board computer can be readily developed by engineers of automobile manufacturers.

The approach of these embodiments is different from current automobile headlight approaches where two sets of headlights are toggled for far and close illumination manually or automatically. One set of the headlight is high beam lights. The other set is low beam lights. In the above embodiment, however, only one set of headlights is enough to achieve both close and far illumination simply by controlling the distance between the LED chip bases and the lens bases. The movement of the LED chip bases and the lens bases can be manually controlled or automatically controlled by sensors and on-board computerized motors.

Figure 36:
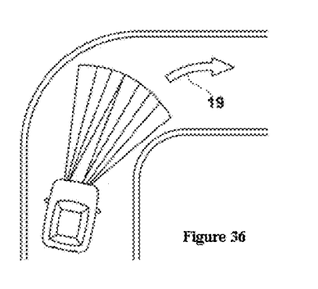
FIG. 36 shows an illustration of using LED lights of present invention as headlights on automobile, wherein the lighting direction 19 is synchronized with the steering action of the automobile.

Another embodiment of automobile headlights is shown in FIG. 36. The relative movement of the LED chip base and lens base of the LED headlights is in two dimensions. The movement can be controlled similarly to the embodiment described in FIGS. 31-33. In addition to adjusting the distance between LED chip base and lens base, another set of lens base can be moved sideway relatively to the LED chip base by another specially designed driving mechanism which is controlled by specially designed on-board firmware. This firmware can be controlled by sensors tied to the steering action of the automobile. The final effect is that not only the focus of the light beams is controlled, the direction of the light beams 19 is also controlled. The light beam can be controlled as to turn in sync with the steering direction, thus helping the drivers to see clearly even at a curve. The sensors and the on-board firmware can be readily developed by engineers of automobile manufacturers.

Figure 37:
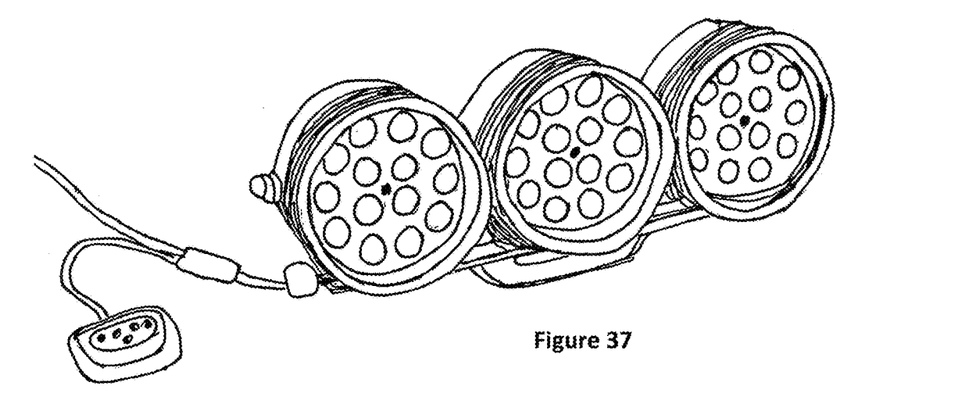
FIG. 37 shows a front view of one embodiment of three 14-LED lights mounted side by side as a siren. The siren can be mounted on top of emergency vehicles.
Figure 38:
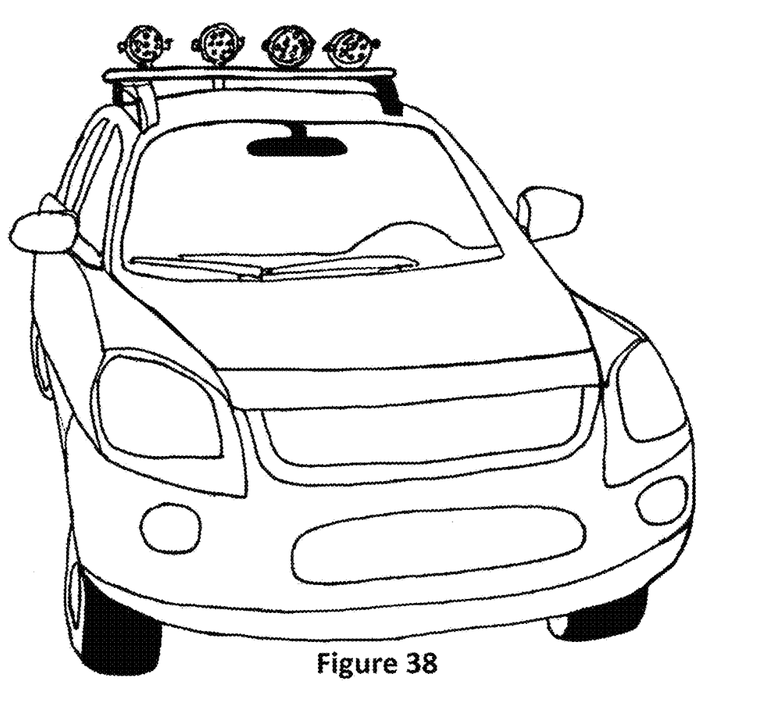
FIG. 38 shows an installation of four 14-LED light on the top of a car.

In another embodiment (FIG. 37 and FIG. 38), 3 to 4 LED lights of different color temperature (e.g. lights with 14-LED chips) are mounted side by side. The whole set of lights can be mounted on the roof top of a car (FIG. 38). The lights are powered on in cycle to emulate the effect of a siren light with flashing blue, red and white lights. In one embodiment, each individual LED lights can also be selected to stay on continuously for illumination purpose.

EXAMPLE 6

Water Proof Mechanisms

The mechanism to adjust light beam focus and power control is vulnerable to leakage, e.g. water or gas leaking into the light. Currently available hand held lights usually use hand wheel to optically adjust the focus of output light beam. Lens is affixed to the inner wall of a hand wheel. By turning the hand wheel, the rotation will change the relative distance between the lens and the light source. The change in relative distance will change the focus of the output light beam. The hand wheel approach is used by many optical instruments such as camera, riflescope and telescopes. Waterproofing the hand wheel mechanism is usually achieved by placing O-rings at where the hand wheel and the lens housing meet. This requires a high precision implementation of O-rings to guarantee waterproofing and to still allow smooth operation of the hand wheel. However, O-rings age and deteriorate over time, diminishing the waterproofing capability.

An alternative to waterproof the hand wheel approach and the power button uses magnets and isolating fully sealed power supply chamber. These methods have been disclosed and described in prior publication such as CN203176758U and CN2445185Y. Magnets are affixed to the inner wall of the hand wheel. While the hand wheel is turned, these external magnets move along the lens axis. Another set of magnets of opposite polarity will be affixed to the inner wall of the lens housing. The whole lens housing is movable inside the optics chamber. When externalized magnets move along the lens axis, the attractive force from external magnets will attract and carry internal magnets to move along the lens axis. This is the simplest way. To achieve an even movement with this mechanism is not easy. The wall of optics chamber is in between the lens housing and external magnets. This wall is a layer of non-magnetic material. The cross-sectional component of the magnetic attractive force will press the lens housing tightly on to the inner wall optics chamber. The friction between the lens housing and the optics chamber will hinder the lens housing to move synchronously with external magnets. A sudden release of the lens housing will be felt when the friction between the lens housing and the inner wall of the optics chamber can no longer resist the forward magnetic force. The feel of focus adjustment can be jerking. It is extremely difficult to change focus precisely and smoothly. The other shortcoming of the simple hand wheel with magnets approach is that the hand wheel has to be turned many rounds in order to move the lens housing by certain distance. The number of required rounds depends on the lead size of the threads of the hand wheel. Too big a lead size will disallow the lens housing to move precisely. Too little a lead size will require turning the hand wheel many rounds in order to move the lens housing a desired distance.

This invention has addressed these issues and improves the waterproof light to have a smooth and quick feel of focus adjustment. In one embodiment of the present invention (FIG. 39A), there is provided a waterproof single LED light with adjustable focus. The light uses magnets to control focus adjustment and power control. The single LED focus adjustable light includes the following parts: main chamber C1, optics chamber C2, focus adjustment mechanism C3, power supply chamber C4, light source chamber C5 and power control mechanism C6.

In accordance with the embodiment (FIG. 39A), optics chamber C2 includes lens housing 21, optical lens 23, focusing lens 8, direction guiding pin 24, direction guiding tube 25, cam groove 72 and a set of internal magnets 27. Lens housing 21 is moveable within main body 74 of main chamber C1. Optical lens 23 and focusing lens 8 are affixed in lens housing 21. Direction guiding pin 24 is affixed on to lens housing 21. Direction guiding tube 25 envelops lens housing 21 which is engraved with position guiding groove 251. Cam groove 72 is carved on direction guiding tube 25 and pushes direction guiding pin 24 to move along position guiding groove 251. Internal magnets 27 are affixed on outer wall of cam groove 72. The physical design of cam groove 72 is very important in the design of this embodiment. It will be explained in further detail later.

Figure 39A:
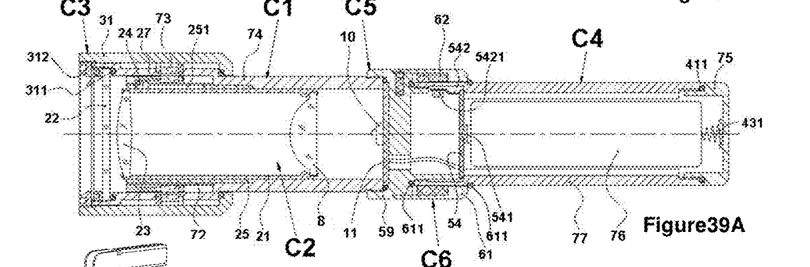
FIG. 39A shows a side cross-sectional view of one embodiment of a single LED light producing adjustable focus light beam. This light is waterproof and explosive proof.
Figure 39B:
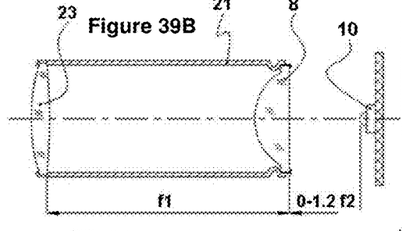
FIG. 39B shows an enlarged view of the optics chamber C2 of the light shown in FIG. 39A.
Figure 40A:
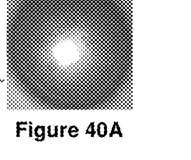
FIG. 40A shows the light beam pattern when the focusing lens of the light in FIG. 39 is at the image forming position (0× focal length of focusing lens).
Figure 40B:
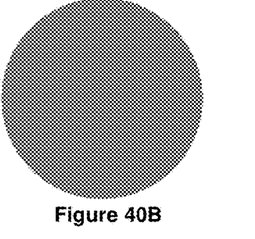
FIG. 40B shows the light beam pattern when the focusing lens is at the widest light beam angle position (1.2× focal length of focusing lens).

Optics chamber C2 and part of light source chamber C5 are detailed in FIG. 39B. Optical lens 23, focusing lens 8 and LED chip 10 are placed on the same axis. Light emitting from LED chip 10 will transmit through focusing lens 8 and optical lens 23 to produce a very even and circular light beam pattern. Distance between optical lens 23 and focusing lens 8 is f1. Focusing lens 8 can move between $0$-$1.2 \times f2$ relative to LED chip 10. f1 is the focal length of optical lens 23. f2 is the focal length of focusing lens 8. When relative distance is between $0$-$1.2 \times f2$, there is an image forming position ($0 \times f2$ and light beam cone angle=1.2°) and a widest light beam positions ($1.2 \times f2$ and light beam cone angle=80°). When focusing lens 8 is at the widest light beam position, an even light beam pattern is generated. When optical lens 23 and focusing lens 8 are approaching LED chip 10, light beam from LED chip 10 will focus gradually and the light beam cone angle will become smaller and vice versa. This light is suitable for both far and near field illumination. When focusing lens 8 is at the image forming position, light beam angle is smallest and the image at LED chip 10 will be projected as an image at a distance as shown in FIG. 40A. When focusing lens 8 is at widest light beam position, light beam angle is the biggest and an even light beam pattern is observed at a distance as shown in FIG. 40B. When focusing lens 8 is somewhere between the image forming position and the widest light beam position, a not so-even and smaller light beam pattern is observed. The light beam pattern can be any shape depending on the shapes of optical lens 23, focusing lens 8 and optics chamber C2. This embodiment is not to limit the shape of light beam pattern in anyway.

According to FIG. 39A, focus adjustment mechanism C3 includes a focus adjustment hand wheel 31 and a set of external magnets 73. Hand wheel 31 is rotatable and envelops main body 74. The end extruding from main body 74 holds waterproof protective lens 22. O-rings 311 are in place to seal where protective lens 22 and main body 74 meet. Protective lens 22 and O-rings 311 are locked in place by tightening locking ring 312. External magnets 73 are affixed on the inner wall of hand wheel 31. External magnets 73 and internal magnets 27 have opposite polarities. When turning hand wheel 31, attractive magnetic force from external magnets 73 will attract internal magnets 27. Cam groove 72 will turn synchronously. Direction guiding pin 24 is bound and pushed to move back or forth by cam groove 72 along position guiding groove 251. Lens housing 21 will move back or forth as well, thereby adjusting the optical focus.

Figure 39C:
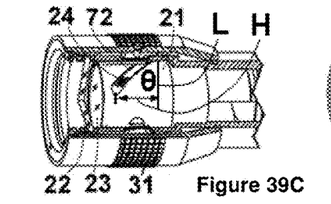
FIG. 39C shows a perspective view of front portion of the light in FIG. 39A with part of hand wheel 31 and main chamber peeled off to reveal the shape of cam groove 72 and direction guiding pin 24.

FIG. 39C shows a perspective view of the light in FIG. 39A with a part of hand wheel 31 and main chamber C1 peeled off to reveal the shape of cam groove 72. Cam groove 72 is carved at a very large rising angle. When hand wheel 31 is turned, external magnets 73 will attract cam groove 72 with internal magnets 27 to turn synchronously. The large rising angle of cam groove 72 will keep the force asserted on direction guiding pin 24 to be mainly along focusing lens 8 axis direction. The force component perpendicular to the focusing lens 8 axis direction is very small. The force in the focusing lens 8 axis direction will move lens housing 21 rather rapidly in a straight line along position guiding groove 251. According to FIG. 39C, rising angle $\theta$, maximum movement H in the lens axis direction of focusing lens 8 and desired traveling distance L of direction guiding pin 24 have a relationship of: $\tan \theta = H/L$, Maximum turning angle $\omega$ of hand wheel 31 can be determined by the relationship of $\omega = L/(\pi D)$, where D is the diameter of lens housing 21. In one embodiment, it is designed to turn hand wheel 31 by 70° ($\omega$) to move lens housing 21 to a maximum distance of 1.2 times focal length f2 of focusing lens 8. The feel of focus adjustment is very smooth and fast. Based on the diameter of the lens housing 21 and focal length f2 of focusing lens 8 and the foresaid relationships, the following actual figures are found: $\omega = 70°$, $\theta = 37.42°$, H=15 mm and L=19.6 mm. Depending on the size of the light and the desired turning angle $\omega$ of hand wheel 31 for full movement of lens housing 21, various tests have been carried out and rising angle $\theta$ of cam groove 72 can be anywhere between 30° to 60°. The specific example herein is for illustrative purposes only and should not limit the scope of the invention which is defined by the claims which follow thereafter.

Another vulnerable part for water or air leakage is the power control mechanism. It is difficult to seal properly if push button, toggle button, slide button or button of any type is used as power control mechanism. Magnets and hand wheel are used for power control in our waterproofing design. According to FIG. 39A, power supply chamber C4 includes a battery 76, battery housing 77 and back cover 75. Battery 76 is placed inside battery housing 77. O-rings 411 are in place to seal where back cover 75 and battery housing 77 are screwed together. Back cover 75 has an installed contact spring 431 to press battery 76 tightly on to contact points.

According to FIG. 39A, light source chamber C5 includes connecting tube 59, LED chip 10, LED chip board 11 inside connecting tube 59 and power supply control board 54 inside battery housing 77. One end of connecting tube 59 is connected and sealed to main body 74. The other end of connecting tube 59 is connected and sealed to battery housing 77. LED chip 10 through LED chip board 11 is electrically connected to power supply control board 54. Power supply control board 54 is soldered with positive contact plate 541 and negative contact plate 542. Positive contact plate 541 electrically connects the positive terminal of battery 76. There is a gap between negative contact plate 541 and inner wall of battery housing 77 when the light is turned off. There is a magnet 5421 on negative contact plate 542.

According to FIG. 39A, power control mechanism C6 includes a power control hand wheel 61 and external magnet 62. Power control hand wheel 61 envelops connecting tube 59. The end of power control hand wheel 61 extruding from connecting tube 59 envelops battery housing 77. External magnet 62 is affixed to the inner wall of power control hand wheel 61. External magnet 62 has opposite polarity from internal magnet 5421 on negative plate 542. Power control hand wheel 61 is tightened to battery housing 77 with position locking ring 611. When power control hand wheel 61 is rotated to ON position, external magnet 62 is positioned across from internal magnet 5421. Because of opposite polarity, external magnet 62 attracts internal magnet 5421. Magnetic attraction will bend negative contact plate 542 to touch inner wall of battery housing 77. A close circuit is formed. The light is turned on. When power control hand wheel 61 is rotated to OFF position, external magnet 62 moves away from internal magnet 5421, magnetic attraction will fade. Negative contact plate 542 will bounce back to neutral position and will not touch inner wall of battery housing 77. The circuit is opened. The light is turned off. There is no chance for water to get in contact with the power supply components. This embodiment is powered by a rechargeable battery which can last as long as twenty two hours of continuous use. The light becomes perfectly waterproof. High intensity, adjustable focus and long usable time make this embodiment a perfect lighting device in demanding emergency and rescue mission. It can also be used as a dive light.

Figure 41:
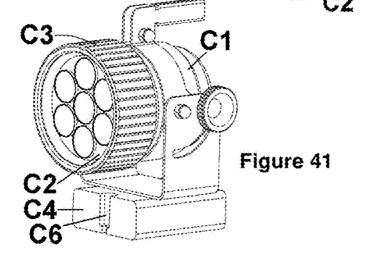
FIG. 41 shows a perspective view of a waterproof and explosive proof dive light. The focus adjustment mechanism uses features similar to the light shown in FIG. 39.
Figure 42:
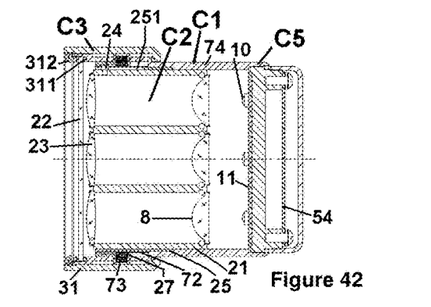
FIG. 42 shows a cross-sectional view of the focus adjustment and optics parts of the light shown in FIG. 41.

In another embodiment, FIG. 41 and FIG. 42 show a multiple LED focus adjustable long distance high intensity light. This embodiment can be viewed as putting together 7 lights as the embodiment shown in FIG. 39A. This embodiment is not to limit the number of LED chips used in anyway. The light includes the following parts: main chamber C1, optics chamber C2, focus adjustment mechanism C3, power supply chamber C4, light source chamber C5 and power control mechanism C6. Power supply chamber C4 encloses rechargeable batteries and is attached to the bottom of the light. Power is connected to light source chamber C5 through sealed electrical cables. The following discussions will concentrate on how focus adjustment mechanism C3 functions with optics chamber C2 and light source chamber C5.

In one embodiment (FIG. 42), optics chamber C2 includes lens housing 21, optical lens 23, focusing lens 8, direction guiding pin 24, direction guiding tube 25, cam groove 72 and a set of internal magnets 27. Lens housing 21 is movable within main body 74 of main chamber C1. Optical lens 23 and focusing lens 8 are affixed in lens housing 21. Direction guiding pin 24 is affixed on to lens housing 21. Direction guiding tube 25 envelops lens housing 21 which is engraved with position guiding groove 251. Cam groove 72 envelops direction guiding tube 25 and turns direction guiding pin 24 to move along position guiding groove 251. Internal magnets 27 are affixed on the outer wall of cam groove 72.

Groups of optical lens 23, focusing lens 8 and LED chip 10 are placed on the same axis. LED chip 10 through LED chip base 11 is electrically connected to power supply control board 54. Light emitting from LED chips 10 will transmit through focusing lens 8 and optical lens 23 to produce a very even and circular light beam pattern. Distance between optical lens 23 and focusing lens 8 is f1. Focusing lens 8 can move between 0-1.2×f2 relative to LED chip 10. f1 is the focal length of optical lens 23. f2 is the focal length of focusing lens 8. When relative distance is between 0-1.2×f2, there is an image forming position (i.e. 0×f2 and light beam cone angle=1.2°) and a widest light beam positions (i.e. 1.2×f2 and light beam cone angle=80°). When focusing lens 8 is at the widest light beam position, an even light beam pattern is generated. When optical lens 23 and focusing lens 8 are approaching LED chip 10, light beam from LED chip 10 will focus gradually and light beam cone angle will become smaller and vice versa. When focusing lens 8 is at the image forming position, light beam angle will be the smallest. The light generated by LED chips 10 will be projected to distance far away. This light is suitable for both far and near field illumination.

According to FIG. 42, focus adjustment mechanism C3 includes a hand wheel 31 and a set of external magnets 73. Hand wheel 31 is rotatable and envelops main body 74. The end extruding from main body 74 holds waterproof protective lens 22. O-rings 311 are in place to seal where protective lens 22 and main body 74 meets. Protective lens 22 and O-rings 311 are locked in place by tightening locking ring 312. External magnets 73 are affixed on the inner wall of hand wheel 31. External magnets 73 and internal magnets 27 have opposite polarities. When turning focus adjustment hand wheel 31, attractive force from external magnets 73 will attract internal magnets 27. Cam groove 72 will turn synchronously. Direction guiding pin 24 is bound and pushed to move back or forth by cam groove 72 along position guiding groove 251. Lens housing 21 will move back or forth as well, thereby adjusting the optical focus. Isolating fully sealed power supply chamber and light source chamber from the focus adjustable optical chamber by the specially designed magnetic applications makes this light absolutely waterproof.

Figure 43:
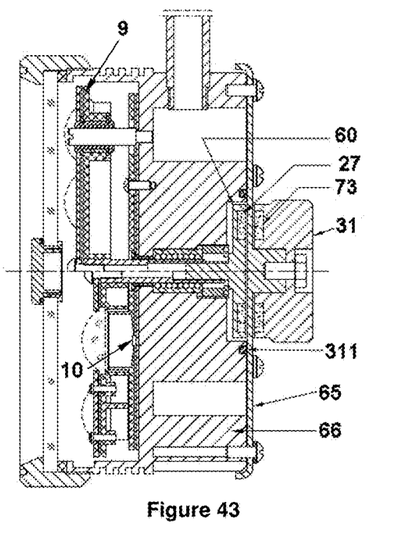
FIG. 43 shows a cross-sectional view of an embodiment of a waterproof and explosive proof LED light. The focus adjustment is by turning a hand wheel 31 at the end of the light. The light uses magnets 27, 73 to isolate the lens housing compartment and LED housing compartment.

In another embodiment, FIG. 43 shows another waterproof and explosive proof light with manual focus adjustment mechanism. Inner housing couples with the threads of the driving bolt 60 of lens base 9. Inner housing has three internal magnets 27 which are spread out by 120°. Focus adjustment hand wheel 31 also has three external magnets 73 of opposite polarity at positions corresponding to internal magnets 27. Attracting forces exist between the two sets of magnets 27, 73. Inner housing and outer hand wheel 31 are isolated with waterproof board 65 which is pressed tightly onto heat sink 66 with O-rings 311 as seal. When hand wheel 31 is turned, the attracting forces will turn inner housing synchronously in the same direction. Effectively, the lens base will be moved back and forth and the light beam focus is changed. The structure of this light is highly sealed to be waterproof and explosive proof. It is extremely suitable for applications in deep water or hazardous location of type Class 1 and condition Division 1 as defined by United States National Electrical Code.

EXAMPLE 7

Additional Applications

In addition, the LED lights of the present invention can be widely used in many other applications including but not limited to the following: airplanes, semitrailers, service trucks, all terrain vehicles, snowmobiles, farming vehicles, construction vehicles, trains, surveillances, military, beacons, stadiums and halls, interior lightings for special effects, exterior lightings for beautification and performance lighting.

REFERENCES

1. U.S. Pat. No. 4,145,113, Ranninger et al. (1997).
2. U.S. Pat. No. 4,654,629, Bezos et al. (1987).
3. CN2445185Y, Yang (2000).
4. U.S. Pat. No. 6,367,949, Pederson (2002).
5. U.S. Pat. No. 7,845,827, Tarter et al. (2010).
6. US 2002/0196620, Sommers et al. (2002).
7. US 2003/0035286, Parker et al. (2003).
8. US 2005/0174772, Gun (2005).
9. US 2005/0231974, Ruffin (2005).
10. US 2006/0245180, Hsu (2006).
11. U.S. Pat. No. 7,214,952, Klipstein et al. (2007).
12. US 2008/0198615, Klipstein (2008).
13. U.S. Pat. No. 7,578,599, Moser et al. (2009).
14. U.S. Pat. No. 7,845,827, Tarter et al. (2010).
15. CN203176758U, He (2013).
16. CN1034878363A, Yang (2013).

What is claimed is:

1. A lighting device comprising:
    a. one or more LED chip bases each of which comprises one or more LED chips;
    b. one or more lens bases each of which comprises one or more lenses, said lens comprises coatings for changing the color temperature of light emitted by said LED chips and transmitted through said lens; and
    c. a motion transmission system to change the position of said lens bases relative to said LED chip bases, wherein each of said lenses is placed along the light path of one or more LED chips, and said lenses change the light beam cone angle of light emitted from said LED chips to produce long distance high intensity illumination,
    wherein said motion transmission system includes a shock-resistant configuration for protecting a shaft of a motor from impact along longitudinal direction of said shaft, said mechanism comprising (i) a motor comprising a cover and a shaft, said shaft comprises at least one flat longitudinal surface, and (ii) a driving bolt with an inner hole, the shape of said inner hole matches the cross-sectional shape of said shaft, wherein said shaft is coupled to said bolt through said inner hole such that said driving bolt can slide along said shaft when an impact force in the longitudinal direction of said shaft is applied on said driving bolt,
    wherein when said shaft rotates, rotational force is directly transmitted from the shaft to the driving bolt,
    wherein when an impact force in the longitudinal direction of the shaft is applied to said driving bolt, said impact force is transmitted onto the cover of the motor and not on said shaft.

2. The device of claim 1, wherein the light beam cone angle is from about 1° to about 80°.

3. The device of claim 1, wherein said motion transmission system is controlled by a wired or wireless remote control device.

4. The device of claim 1, wherein said motion transmission system moves said lens bases in a direction parallel to the optical axes of said lenses.

5. The lighting device of claim 1, wherein said driving bolt further comprises a driving gear at its distal end, said driving gear is coupled to a transmission shaft, said shaft comprises a first end and a second end that are located on opposing ends of said shaft, wherein said first end that is engaged to a first group of lens bases comprising two or more lens bases, said second end is engaged to a second group of lens bases comprising two or more lens bases, wherein rotation of said driving gear will cause rotation of said transmission shaft, thereby resulting in moving said first and second groups of lens bases in different direction on a plane that is parallel to said LED chip bases.

6. The device of claim 5, wherein moving said lens bases on a plane that is parallel to said LED chip bases will cause light transmitted through the lenses on different lens bases to converge into a single spot or separate into a plurality of spots, wherein the plurality of spots can be connected to form a wide light beam.

7. The device of claim 5, wherein the device is used as headlight for an automobile.

* * * * *